June 18, 1935.  R. A. CHILCOTE  2,005,494
GLASS FEEDER
Filed Jan. 17, 1933   4 Sheets-Sheet 1

INVENTOR
R. A. CHILCOTE
By Hazard & Miller
ATTORNEYS

June 18, 1935. R. A. CHILCOTE 2,005,494
GLASS FEEDER
Filed Jan. 17, 1933 4 Sheets-Sheet 2
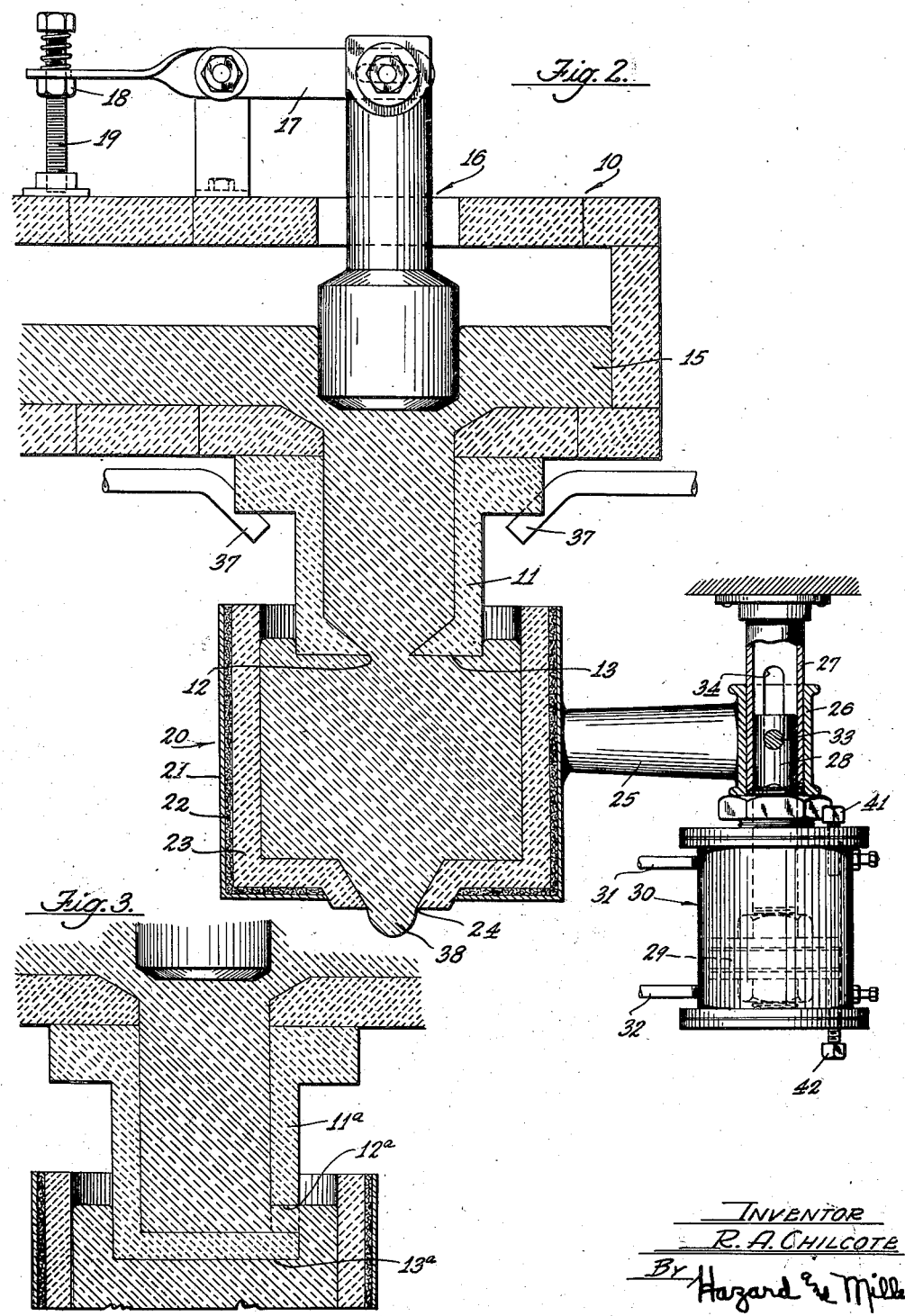

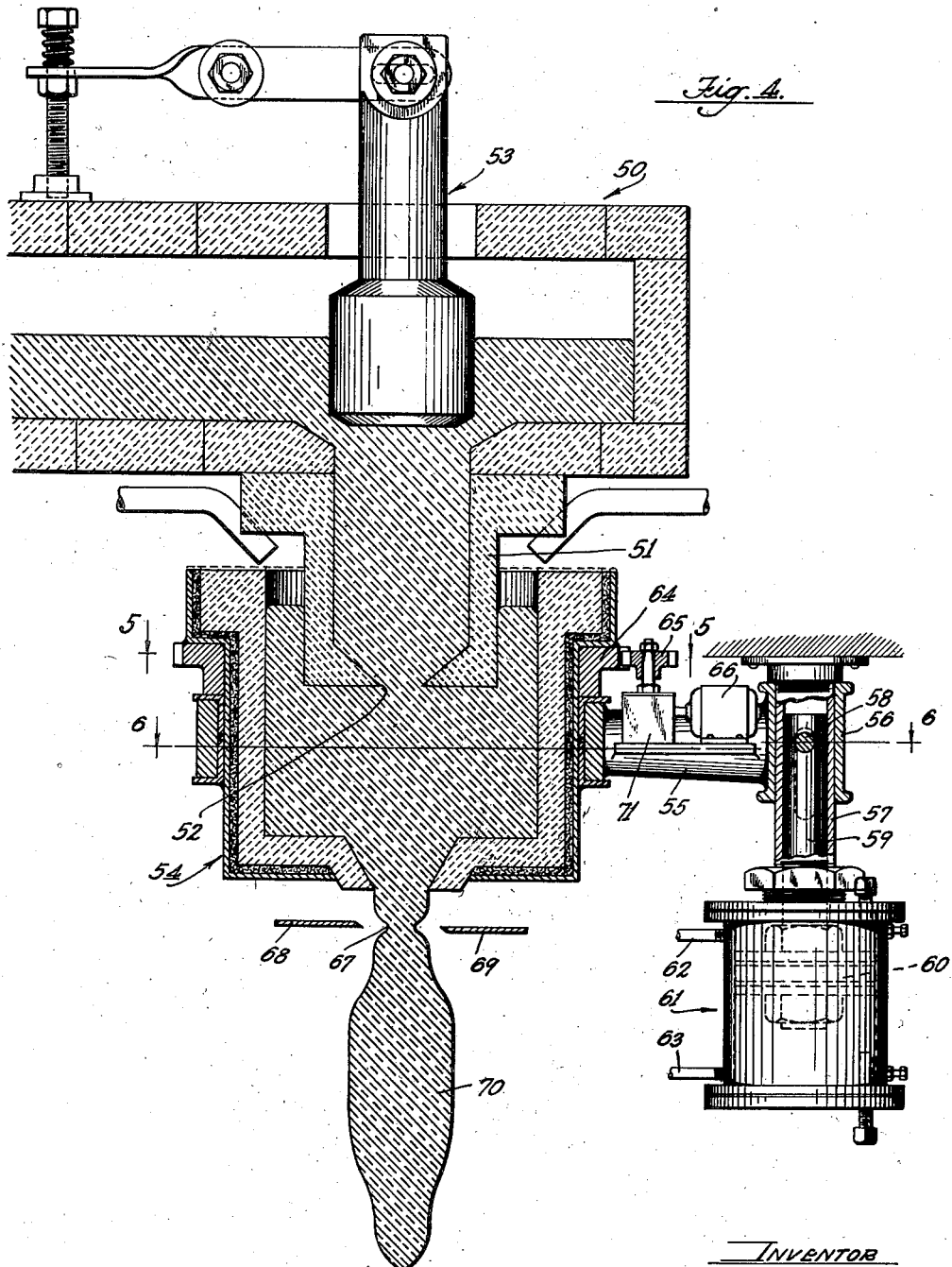

June 18, 1935.  R. A. CHILCOTE  2,005,494
GLASS FEEDER
Filed Jan. 17, 1933    4 Sheets-Sheet 4
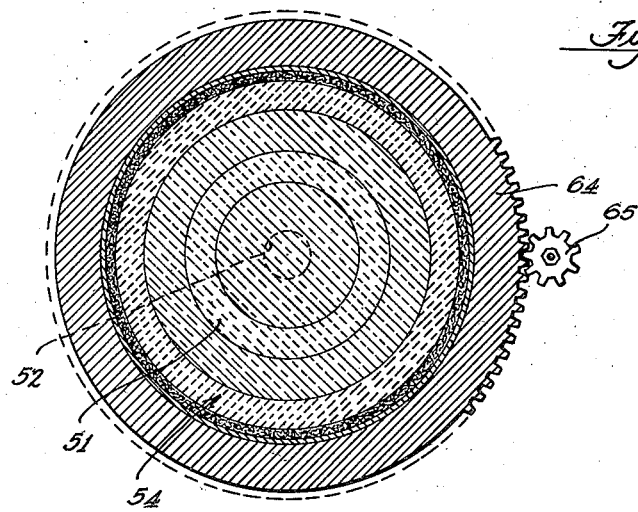
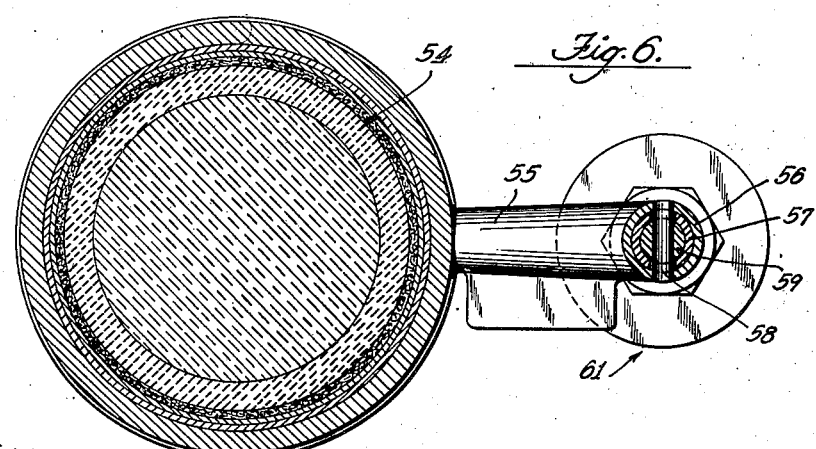
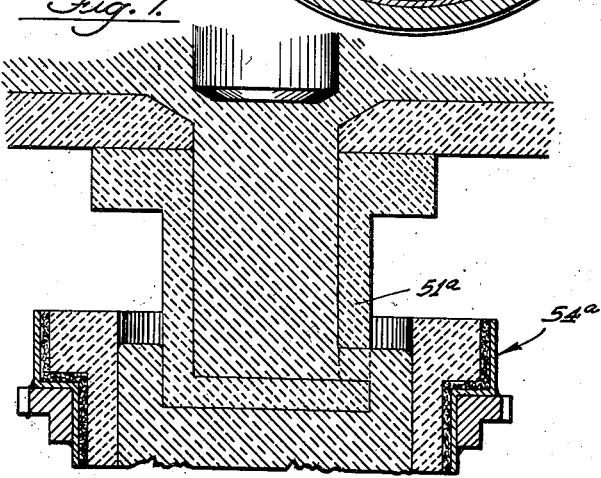
INVENTOR
R. A. CHILCOTE
By
Hazard & Miller
ATTORNEYS Patented June 18, 1935

2,005,494

UNITED STATES PATENT OFFICE 2,005,494

GLASS FEEDER

Ray A. Chilcote, Los Angeles, Calif., assignor of one-half to McLaughlin Glass Co., Los Angeles, Calif., a corporation of California Application January 17, 1933, Serial No. 652,171

9 Claims. (Cl. 49—55)

This invention relates to a glass feeder for feeding molten glass into the molds of a molding machine. Heretofore it has been customary to feed molten glass from the so called tank through a forehearth and on discharging the glass from the forehearth to divide it into mold charges which are consecutively dropped into molds positioned therebeneath by a molding machine. In dividing the glass into mold charges the apparatus causing the glass to be divided is usually located in the forehearth itself or at some location above the outlet from the forehearth. Consequently the apparatus producing the division of the glass into the mold charges is subject to the heat and corrosive effect of the molten glass. Devices have been developed for alternately imposing an air pressure on a portion of the glass to be discharged or extruded in the form of a mold charge and subsequently producing a vacuum. In such devices the apparatus is likewise located above the outlet from the forehearth or within the forehearth itself.

An object of the present invention is to provide a construction for separating the glass as it is discharged from the forehearth into mold charges, which construction is located beneath the forehearth and beneath the outlet therefrom. With this arrangement the apparatus is subjected to less heat and can be easily and conveniently operated and adjusted to produce mold charges of different sizes.

The improved apparatus also develops alternately a pressure in the glass to extrude it and a partial vacuum without resorting to any air chambers submerged in the glass itself. In this way the glass can be extruded forming a mold charge of predetermined size and then on developing the partial vacuum within the molten glass a small neck will be formed at the top of the mold charge which can be easily severed by the conventional shears. The severed neck also tends to be drawn back toward the source of supply until the succeeding pressure is developed by the apparatus so that the severed neck will be partially returned to a locality of sufficiently high temperature as to keep the severed neck from chilling.

More specifically an object of the invention is to provide a glass feeding apparatus consisting of a forehearth having an outlet and an apertured cup into which the outlet extends, with provision made for reciprocating the apertured cup in synchronism with the mold machine causing a mold charge to be formed at the proper time, and the formation of the narrow neck which can be easily severed by the shears.

A further object is to provide an apparatus for rotating the cup during its reciprocation. It sometimes occurs that when the mold charge is formed there is a tendency for the glass to chill on one side. This is quite noticeable in some instances by the mold charge bending due to the glass having become chilled on that side about which the bend takes place. By having the cup rotate, the heat is evenly distributed so that when the mold charge is formed the glass is of substantially uniform viscosity throughout and when deposited in the mold it may freely be forced into all portions thereof.

With the foregoing and other objects in view, which will be made manifest in the following detailed description, and specifically pointed out in the appended claims, reference is had to the accompanying drawings for an illustrative embodiment of the invention, wherein:

Fig. 2 is a view similar to Figure 1 illustrating the cup at the bottom of its downward stroke.

Fig. 3 is a partial view in vertical section illustrating a modified form of outlet which may be used on the forehearth.

Fig. 4 is a view similar to Figure 1 illustrating a modified form of construction wherein the cup is caused to rotate during its reciprocation.

Fig. 5 is a horizontal section taken substantially upon the line 5—5 upon Figure 4.

Fig. 6 is a horizontal section taken substantially upon the line 6—6 upon Figure 4.

Fig. 7 is a partial view in vertical section illustrating a modified form of outlet from the forehearth used in conjunction with the rotating cup type of construction.

Figure 1:
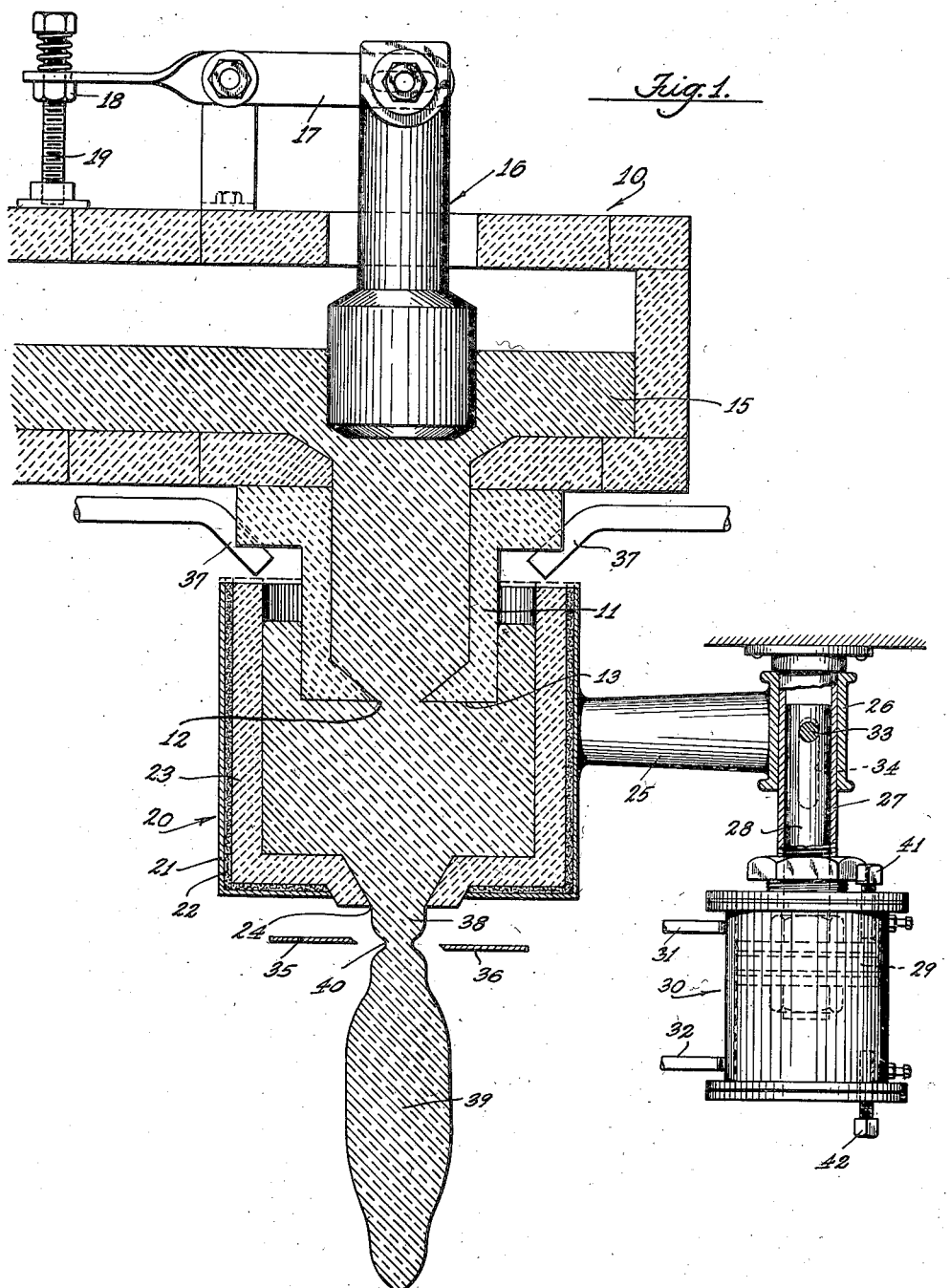
Fig. 1 is a view in vertical section illustrating the improved glass feeder, the cup being shown at the beginning of its downward stroke.

Referring to the accompanying drawings, wherein similar reference characters designate similar parts throughout, and particularly to Figures 1 and 2, the forehearth leading from the tank is indicated generally by the reference character 10. It has, at its bottom, an outlet formed by a nipple 11, which is made of suitable refractory material. This nipple has, in this form of the invention, a relatively small central outlet or orifice 12 surrounded by comparatively large flat surfaces 13 the function of which will be hereinafter described. The forehearth 10 receives the molten glass 15 which is maintained in the forehearth at about the level shown. The rate of feed of molten glass into the nipple may be regulated by means of a suitable valve or feed control 16, which may be mounted on a lever 17 on top of the forehearth; and adjustment being made by screwing nut 18 up or down on stud 19. Any other suitable mechanism for regulating the flow into nipple 11 may be employed. Below the nipple 11 there is mounted a suitable cup 20 consisting of an outer cup like shell 21 within which there is a layer of heat insulating material 22 and within this there is a layer of refractory material 23. This cup has an apertured bottom 24, preferably arranged in vertical alignment with outlet or orifice 12. The cup is carried by an arm 25 which is on a sleeve 26 surrounding a tubular column 27 which may be suitably mounted. Within this column there is a piston rod 28 which is connected to a piston 29 inside of an air cylinder 30. Pipes 31 and 32 lead to the cylinder at apposite sides of the piston and provide for admission and exhaust of air pressure to reciprocate the piston in the cylinder. The piston rod carries a diametrical pin 33 operating in a slot 34 in the column 27. The pin extends through sleeve 26 which may slide up and down on the outside of column 27.

The conventional shears, the blades of which are indicated at 35 and 36, are located beneath the bottom of the cup and disposed a short distance below the bottom of the cup when the cup is at the bottom of its downward stroke. The particular mechanism for operating the shears may be conventional and, as the construction of the shear operating mechanism forms no part of the present invention, this mechanism is not disclosed.

There is preferably a sufficient clearance between the inside walls of the cup and the exterior of nipple 11 to comply with conventional glass practice. Suitable burners 37 may be arranged adjacent the sides of nipple 11 to play flame on the nipple and keep the glass flowing therethrough adequately warm.

The operation and advantages of this form of construction are as follows. The molten glass 15, which is highly viscous, flows slowly down through nipple 11 and into the cup 20. During the downward stroke of piston 29 and of the cup, a partial vacuum is formed in the cup which is effective to draw molten glass from the nipple 11 down into the cup. It is also effective to a limited extent to cause the upper portion, indicated at 38, of the neck to be drawn back into the cup so that this partially extruded amount of glass will be returned to the volume of molten glass in the cup and kept hot until the succeeding mold charge is formed. The partial vacuum produced is not so effective on the exposed surfaces of the glass between nipple 11 and the interior of the cup inasmuch as these surfaces of the glass are the coolest portions in the cup and resist flowing to a considerable extent. On the upstroke of the cup, that portion of the glass which has been drawn into the cup is extruded through outlet or aperture 24. The wide surfaces 13 cause the nipple to act somewhat as a ram or plunger assisting in this extruding action. When the glass is extruded it forms an elongated body 39 forming a mold charge. In Figure 1 the dotted lines immediately above the cup indicate the top of the upward stroke and the cup in this figure is shown as having just been started on its downward stroke. When it starts on its downward stroke, a partial vacuum starts to be reformed in the cup with the result that portion 38 tends to return to the cup. This results in the forming of a relatively small neck 40, which is formed just as the cup starts on its downward movement. The shear blades 35 and 36, which are operated in synchronism with the apparatus, move together and sever the mold charge 39 from the body of molten glass within the cup just as the neck is formed. The mold charge can then drop into the mold which has been positioned beneath the cup by the molding machine and the severed portion 38 partially returns to the cup during the remainder of the down-stroke while an additional charge or gather is drawn from nipple 11 into the cup. It will be appreciated by those familiar with the art that the shear blades 35 and 36 and the piston 29 can be driven to operate in synchronism with the mold machine by any suitable valve mechanism for controlling the supply of air delivered to the cylinder through pipes 31 and 32 and to the operating mechanism for the shear blades.

In the modification shown in Figure 3 a different type of nipple indicated at 11ª is employed. In all other respects the apparatus is the same. In this form of construction the nipple 11ª instead of having a central outlet or orifice, has a lateral outlet or orifice indicated at 12ª. In this type of construction the bottom of the nipple 11ª presents a large flat surface 13ª operating as a plunger or ram during the upward stroke of the cup to extrude or force the glass out of the cup to form the mold charge. This form of nipple is sometimes found desirable where a large mold charge is to be formed.

When it is desired to form mold charges of slightly different size, suitable adjustment is provided, this being indicated by top and bottom set screws 41 and 42 on the cylinder. These may be adjusted and serve as stops limiting the stroke of the piston and thus limiting the stroke of the cup. It will be appreciated that when a smaller stroke of cup is obtained that the quantity drawn into the cup from the nipple and extruded during any cycle of operation will be made smaller. In this way a very fine adjustment is possible for adjusting the size of mold charge.

In the modification shown in Figure 4, the forehearth is indicated at 50, having the outlet nipple 51 with its central aperture or orifice 52. The regulator 53, regulating the flow into the nipple, is mounted on top of the forehearth as before. In this form of construction the cup, generally designated at 54, is rotatably supported on arm 55 which is carried by sleeve 56 about column 57 and which is reciprocated by the diametrical pin 58 carried by piston rod 59 on piston 60 which is in the cylinder 61. The pipes leading to and from the cylinder are indicated at 62 and 63. The cup 54, which is rotatably mounted on arm 55, carries an annular gear 64 which is in mesh with a spur gear 65 driven by a variable speed motor 66 which is mounted on arm 55. In this form of connstruction, as before, a downward stroke of the cup draws a supply of glass from nipple 51 into the cup and draws up the severed portion of the neck. At the start of the downstroke the narrow neck 67 is formed and immediately sheared off by shear blades 68 and 69 and during the remainder of the downstroke the severed portion of the neck is returned or drawn back up toward the outlet from the cup. The motor 66, however, continuously drives spur gear 65 and the cup is caused to continually rotate during its reciprocation. This causes the heat to be evenly distributed throughout the glass in the cup so that when the mold charge 70 is formed it will be of evenly heated glass and there will be no tendency for the mold charge to deform due to the glass having been chilled on one side. The speed of rotation of the cup is not great and a speed reduction gear box 71 may be interposed between the motor 66 and spur gear 65.

In the modification shown in Figure 7 the construction of the cup, generally designated at 54ª, is the same as that disclosed on Figure 4. The nipple, however, indicated at 51ª is similar in construction to nipple 11ª, having the lateral outlet and presenting the large bottom surface which will act as a plunger or ram to extrude the glass through the bottom of the cup in forming the mold charge.

From the above described constructions it will be appreciated that in the improved glass feeder all of the apparatus which divides the glass into mold charges is located outside of the forehearth and beneath the outlet nipple therefrom. The apparatus in this arrangement is not subject to the high heat nor corrosive effect of the molten glass. There is no occasion to use air pressures or partial vacuums in submerged chambers submerged in the glass as in prior constructions. By the apparatus a pressure is produced in the glass itself and a partial vacuum is produced therein mechanically causing the glass to be momentarily extruded to form the mold charge and causing a narrow neck to be produced at the top of the mold charge which can be severed and the small nipple left by severing the neck is caused to temporarily return or to be drawn back up into the molten supply or gather in the cup to be kept hot until there is a succeeding extrusion and formation of mold charge. The apparatus also, as disclosed in Figures 4 and 7, provides for continuously rotating the cup while the mold charge is being formed, thus bringing about an even distribution of heat in the mold charge so that when it is dropped into the mold no portions of the charge will have been subjected to any severe chilling.

Various changes may be made in the details of construction without departing from the spirit or scope of the invention as defined by the appended claims.

I claim:

1. An apparatus for feeding glass comprising a forehearth having a downwardly extending nipple providing an outlet, a cup shaped member into which the nipple extends, and means for causing relative reciprocating movement to take place between the cup shaped member and the nipple, the arrangement being such as to cause glass to be extruded during a stroke in one direction and a tendency for extruded glass to be caused to intrude into the cup shaped member during a stroke in the opposite direction.

2. An apparatus for feeding glass comprising a forehearth having a downwardly extending nipple providing an outlet, a cup shaped member into which the nipple extends, means for causing relative reciprocating movement to take place between the cup shaped member and the nipple, the arrangement being such as to cause glass to be extruded during a stroke in one direction and a tendency for extruded glass to be caused to intrude into the cup shaped member during a stroke in the opposite direction, and means for shearing off the extruded glass at the beginning of the intrusion producing stroke.

3. An apparatus for feeding glass comprising a forehearth having a downwardly extending nipple providing an outlet, a cup shaped member having an outlet therein and into which the lower end of the nipple extends, and means for reciprocating the cup shaped member toward and away from the nipple.

4. An apparatus for feeding glass comprising a forehearth having a downwardly extending nipple providing an outlet, a cup shaped member having an outlet therein and into which the lower end of the nipple extends, means for reciprocating the cup shaped member toward and away from the nipple, and means for rotating the cup shaped member during its reciprocation.

5. An apparatus for feeding glass comprising a forehearth having a downwardly extending nipple providing an outlet, a cup shaped member having an outlet therein and into which the lower end of the nipple extends, means for reciprocating the cup shaped member toward and away from the nipple, and means for varying the length of stroke of the cup shaped member.

6. An apparatus for feeding glass comprising a forehearth having a downwardly extending nipple providing an outlet, a cup shaped member having an outlet therein and into which the lower end of the nipple extends, and means for reciprocating the cup shaped member toward and away from the nipple, said nipple having a lateral outlet and an imperforate bottom affording a resistance to glass in the cup shaped member and tending to extrude it therefrom on the upstroke of the cup shaped member.

7. An apparatus for feeding glass comprising a forehearth having a downwardly extending nipple providing an outlet, a cup shaped member having an outlet therein and into which the lower end of the nipple extends, means for reciprocating the cup shaped member toward and away from the nipple, and means for rotating the cup shaped member during its reciprocation, said nipple having a lateral outlet and an imperforate bottom affording a resistance to glass in the cup shaped member and tending to extrude it therefrom on the upstroke of the cup shaped member.

8. An apparatus for feeding glass comprising a forehearth having a downwardly extending nipple providing an outlet, a cup shaped member having an outlet therein and into which the lower end of the nipple extends, and means for reciprocating the cup shaped member toward and away from the nipple, said nipple having a central outlet surrounded by flat surfaces affording a resistance to glass in the cup shaped member and tending to extrude it therefrom on the upstroke of the cup shaped member.

9. An apparatus for feeding glass comprising a forehearth having a downwardly extending nipple providing an outlet, a cup-shaped member having an outlet therein and into which the lower end of the nipple extends, and means for causing relative reciprocating movement to take place between the cup-shaped member and the nipple so as to cause the cup-shaped member and the nipple to move toward and away from each other.

RAY A. CHILCOTE.